(12) United States Patent
Tigonen

(10) Patent No.: US 6,321,666 B1
(45) Date of Patent: Nov. 27, 2001

(54) CYCLE INSTALLATION FOR UTILIZATION OF WASTE CONTAINING POLYMER COMPOUNDS

(76) Inventor: Vladimir Tigonen, Myllykylautie 31B, 02400 Kirkkonummi (FI)

( * ) Notice: Subject to any disclaimer, the term of this patent is extended or adjusted under 35 U.S.C. 154(b) by 0 days.

(21) Appl. No.: 09/697,413

(22) Filed: Oct. 26, 2000

(30) Foreign Application Priority Data

Oct. 27, 1999 (EE) .............................................. 199900336

(51) Int. Cl.⁷ ....................................................... F23G 7/12
(52) U.S. Cl. .......................................... 110/346; 110/348
(58) Field of Search .................................... 110/210, 211, 110/212, 213, 214, 342, 344, 346, 347, 348

(56) References Cited

U.S. PATENT DOCUMENTS

| | | | |
|---|---|---|---|
| 3,601,069 | * | 8/1971 | Mancuso ............................. 110/8 C |
| 3,807,321 | * | 4/1974 | Stockman ............................ 110/8 R |
| 4,162,654 | * | 7/1979 | Spitz et al. ............................ 110/212 |
| 4,402,738 | * | 9/1983 | Akio ...................................... 75/445 |
| 4,452,152 | * | 6/1984 | John et al. ............................ 110/235 |
| 4,452,154 | * | 6/1984 | Kono et al. ........................... 110/346 |
| 4,763,583 | * | 8/1988 | Przewalski ........................... 110/246 |
| 4,895,083 | * | 1/1990 | Mcdilda ................................ 110/235 |
| 4,936,231 | * | 6/1990 | Johnson ................................ 110/235 |
| 5,224,431 | * | 7/1993 | Lee et al. .............................. 110/210 |
| 5,279,234 | * | 1/1994 | Bender et al. ........................ 110/210 |
| 5,291,840 | * | 3/1994 | Nakao ................................... 110/235 |
| 5,313,894 | * | 5/1994 | Ishikawa ............................... 110/235 |
| 5,477,790 | * | 12/1995 | Foldyna et al. ....................... 110/346 |
| 5,619,938 | * | 4/1997 | Kaneko ................................. 110/346 |
| 5,720,232 | * | 2/1998 | Meador ................................. 110/346 |
| 5,770,017 | * | 6/1998 | Brown et al. ......................... 201/25 |
| 5,836,524 | * | 11/1998 | Wang .................................... 241/23 |
| 6,037,560 | * | 3/2000 | Titus et al. ....................... 219/121.37 |
| 6,244,198 | * | 6/2001 | Suominen ............................. 110/342 |

FOREIGN PATENT DOCUMENTS

| | | |
|---|---|---|
| 02943 | 1/1996 | (EE) . |
| 9800195 | 3/1999 | (EE) . |

OTHER PUBLICATIONS

Advertisement entitled Equipment for disposal of used cars tires TIG (Tires Intensive Gasification), 5 pages.

* cited by examiner

*Primary Examiner*—Denise L. Esquivel
*Assistant Examiner*—K. B. Rinehart
(74) *Attorney, Agent, or Firm*—Garrison & Assoc. PS; David L. Garrison

(57) ABSTRACT

Apparatus and method of utilization of waste tires by thermal processing into usable oil and fuel constituents is described in which the tires are heated to breakdown the rubber and other polymeric constituents at a temperature of up to about 1400° C. The gasification unit is a closed gas generator having a plurality of injectors for introduction of primary air. Gases generated by heating and combustion of the tires is rich in oil and gases useful in the chemical and power industries.

4 Claims, 4 Drawing Sheets

CYCLE INSTALLATION FOR UTILIZATION OF WASTE CONTAINING POLYMER COMPOUNDS

Figure 1:
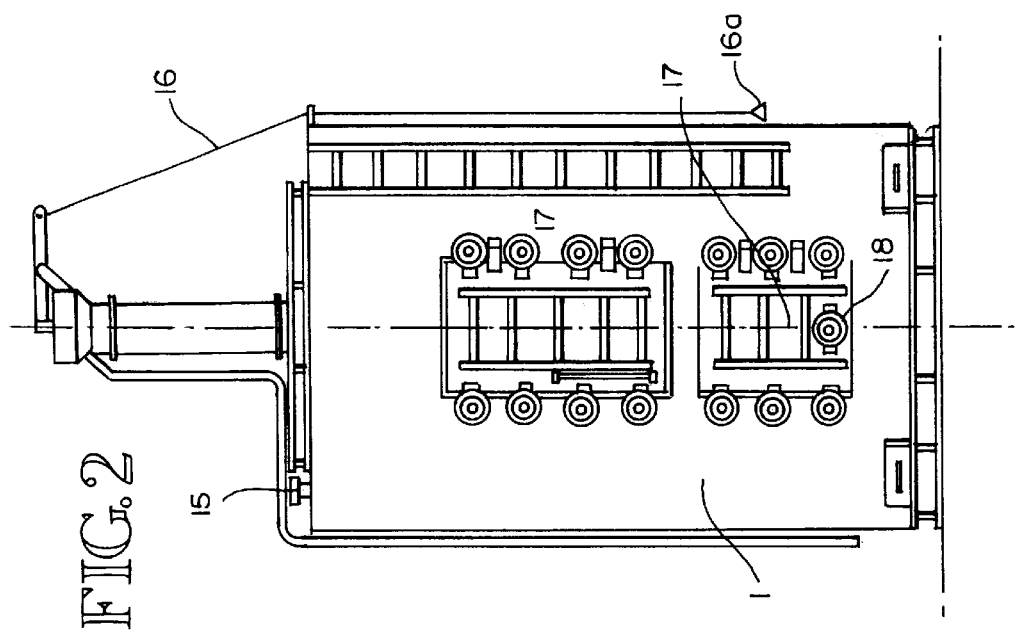

This application claims the benefit of Estonian Patent Application No. 199900336, entitled Cyclic Installation for Utilization of Waste Containing Polymer Compounds, and filed Oct. 27, 1999.

The invention belongs to the field of devices for the utilization of waste products containing polymeric compounds, primarily worn automobile tires.

Worn-out tires of all types and uses present a serious ecological problem for the entire world. With a rather low storage density (approximately 160 kg/m$^3$), they require a great deal of storage space and may cause the combustion and instability on the whole of other waste products. The total accumulated mass of old automobile tires in developed countries is, according to different estimates, from 10 to 20 kg for each resident. Synthetic or natural rubber, which according to its chemical composition is a product of the polymerization of unsaturated hydrocarbons, is the primary component of the rubber mass.

The existing patent is EE02943B1 Int. C1.6 CO8J 11/2; C10G 1/10 "Utilization of rubber waste products by a solid shale heat carrier decomposing thermal process." The holders and authors are: K. Senchugov, V. Chikul, A. Kaidalov, L. Shaparenko, A. Popov, B. Kindorkin, A. Elenurm, M. Marguste, Ju. Lushnyak; the patent application publication date is Dec. 15, 1995.

The existing invention relates to the utilization of polymeric waste products, primarily those of worn automobile tires, by means of thermal processing (semi-coking) with the goal of the manufacture of oil and gas for the chemical and power industries.

The complete utilization of rubber waste products takes place according to the solid heat-carrier method with the destructive thermal processing of a mixture of crushed rubber and shale.

This is a rather complicated technological process, which requires additional handling of the automobile tires—the crushing, which takes place at a low temperature (no more than 800° C.) and involves the necessary addition of shale.

The existing utility model is EE9800195U1, Int. C1.6 CO8J 11/12; C10G 1/10"Line for the complete utilization of waste rubber tires", authors: A. Reiner, M. Marguste, Ju. Pjarnits, Ju. Kann, Ju. Kriis, publication date of the application Apr. 15, 1999.

The existing line consists of a semi-coking mechanism, a mixing tank, a furnace and a rubber crusher.

The process for the utilization of waste rubber tires proceeds in two stages, includes a preliminary crushing, and is complicated and time-consuming, which significantly increases the cost of its use.

The goal of the present invention is:
to present a cyclical apparatus for the utilization of waste products containing polymeric compounds, primarily those used in automobile tires, with a high degree of utilization (more than 90%) due to the high temperature (up to 1400° C.) of the consuming gases.

Taking into consideration the need to protect the environment and the need to resolve the established goal, the cyclical apparatus for the utilization of waste products containing polymeric compounds, primarily those used in automobile tires, contains two basic assemblies:
  a gasification unit, consisting of a gas generator 1 and a primary air blower 2,
  an assembly for the utilization of organic gas consisting of a combustion and utilization injector 24, a gas line 13 of 130–160 mm diameter, a valve for secondary air 23 of 100–250 mm diameter, a secondary air blower 21 a pipe 20 of 400–600 mm diameter, insulated from within by heat-resistant concrete.

The gas generator 1 is made up of a tank (outer shell) 3, of 3–4 meters in diameter and 4–5 meters high, containing a chute 17 for loading automobile tires and removing ashes, a reactor 4 with an upper spherical lid 10 upon which a chimney 14 of 150–300 mm diameter and height of 1–2 meters is positioned.

The bottom of the reactor, 4, contains from 80 to 120 injectors for the introduction of primary air into the reactor 4.

The present invention permits a significant increase in the process's degree of utilization (up to 90%), due to the increase in the temperature of the consuming gases, and at the same time significantly lowers the cost of the utilization process.

The invention is presented in drawings.

FIG. 1—a general view of the cyclical apparatus for the utilization of waste products containing polymeric compounds, and a side view.

FIG. 1A is a side view of the apparatus shown in FIG. 1.

Figure 2:
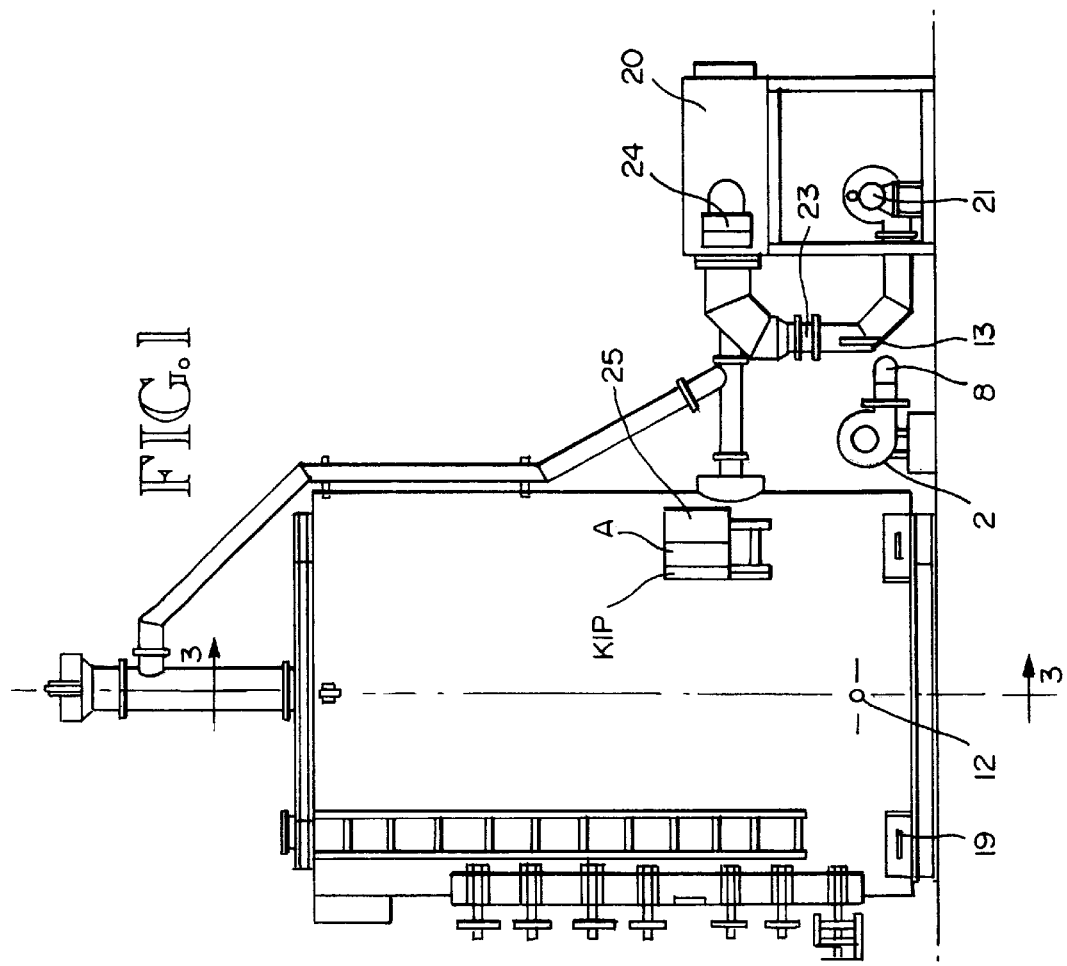

FIG. 2—the gas generator, view A—A.

Figure 3:
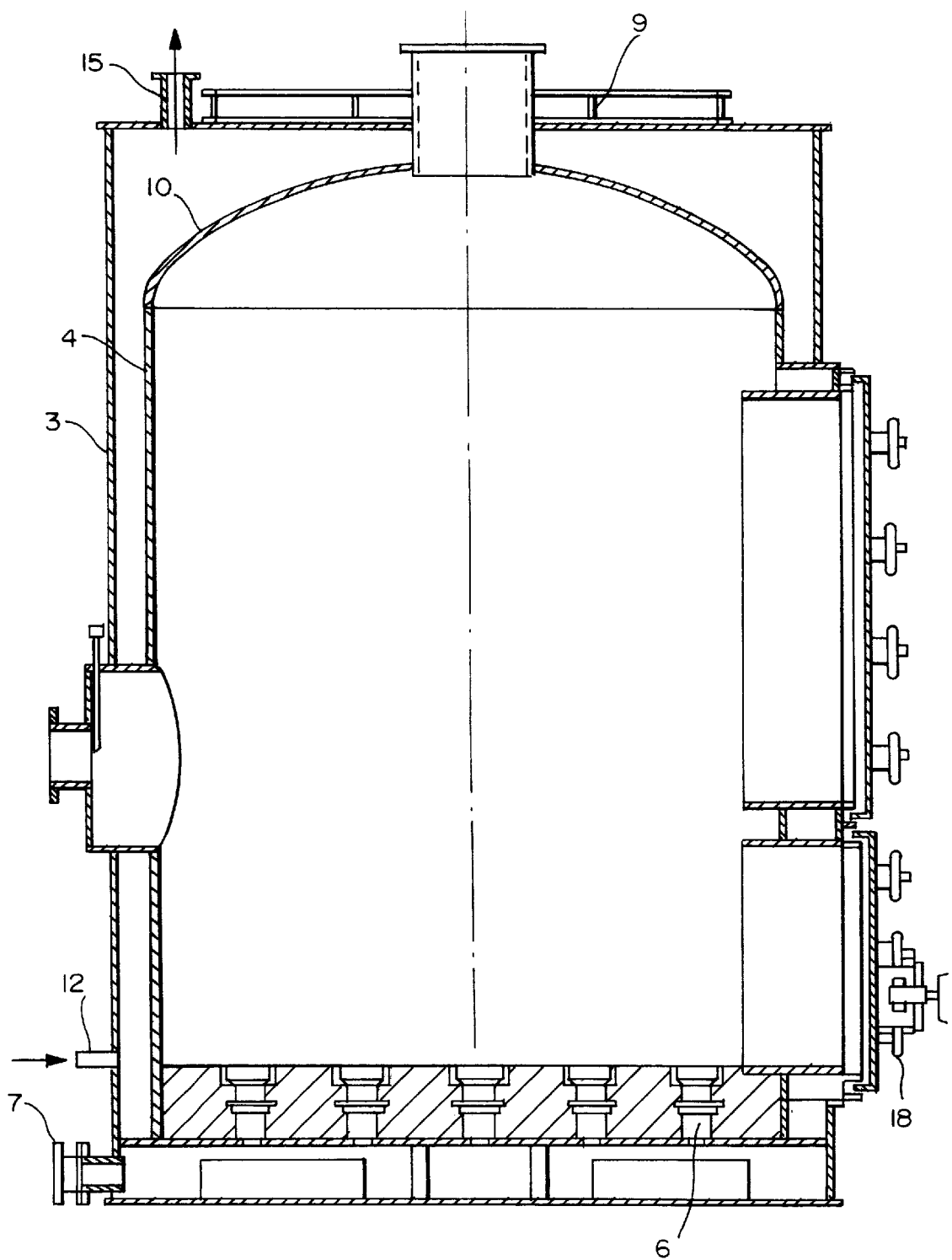

FIG. 3—utilization assemblies, general view and view from above.

FIG. 3A is a plan view of the apparatus shown in FIG. 3.

Figure 4:
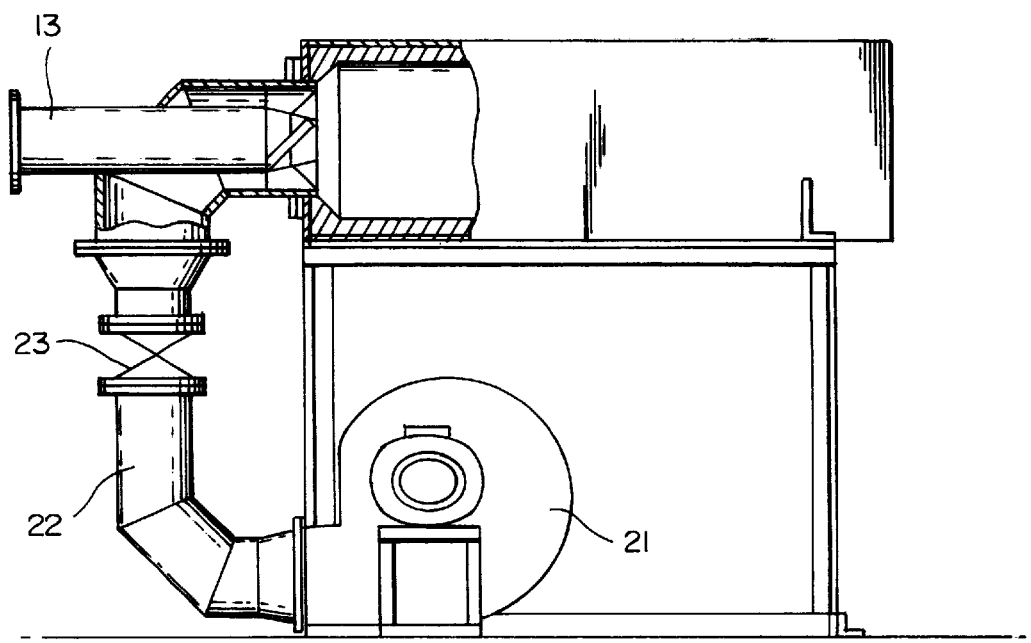
Figure 5:
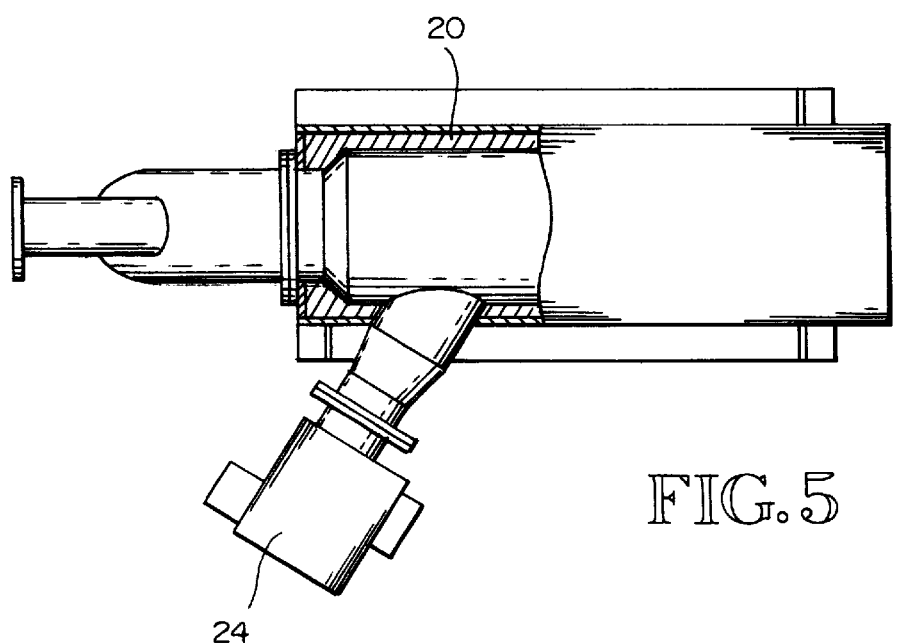
Figure 6:
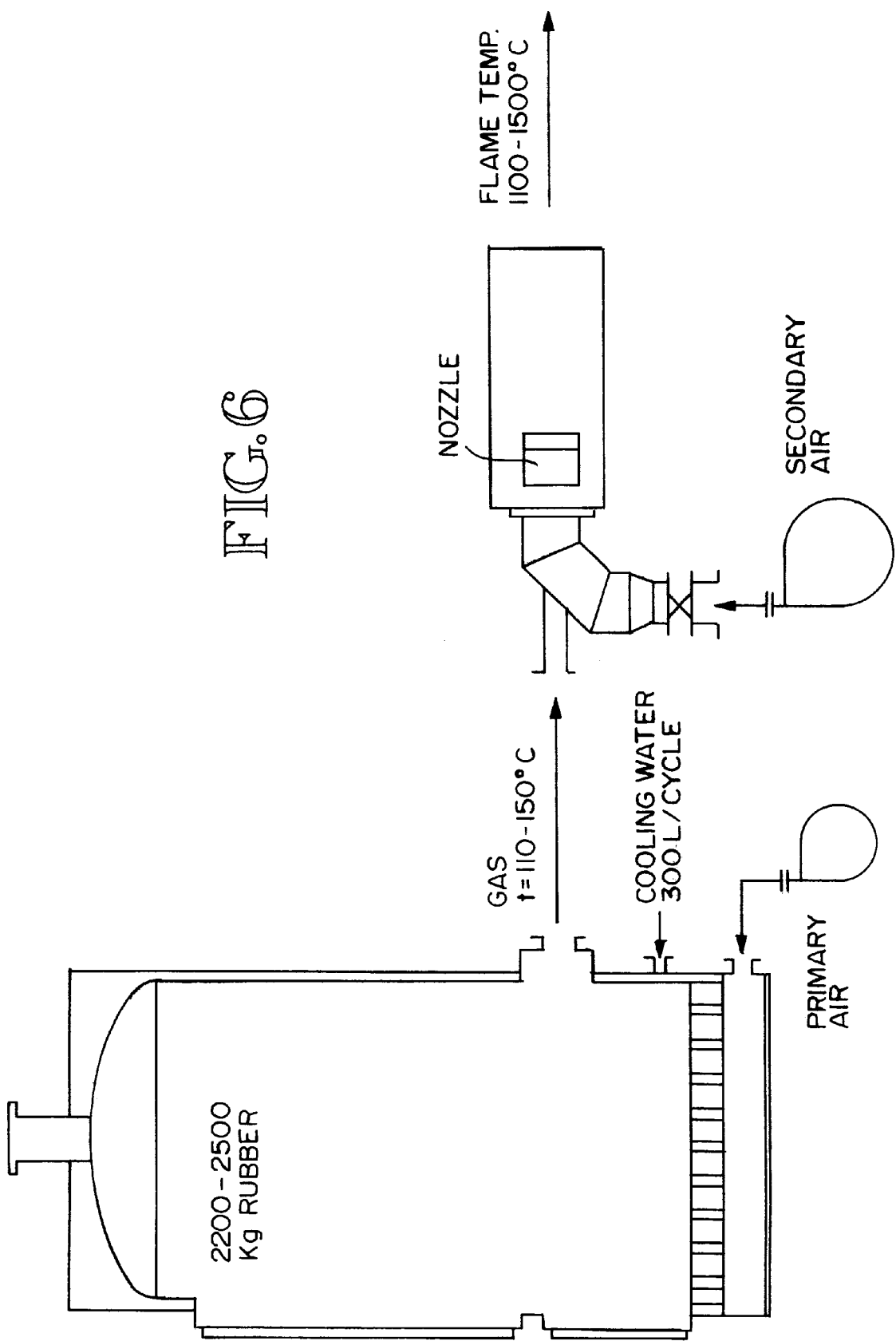

FIG. 4—technological plan of the work of the cyclical apparatus for the utilization of waste products containing polymeric compounds.

submitted apparatus consists of two basic assemblies: a gasification unit and a utilization assembly.

The gasification unit contains a gas generator 1 with a primary air blower 2.

The gas generator 1 is made up of a tank (outer shell) 3 and reactor 4, in which are placed from 80 to 120 injectors 6 for the introduction of primary air. The primary air is introduced by the blower 2 through throttle valve 7 via pipeline 8 into the lower portion of the gas generator 1.

The tank (outer shell) 3 is made of construction steel St 3 of 8-mm thickness.

In contrast to lid 9 of the tank (outer shell) 3, the lid 10 of the reactor 4 is hemispherical. A 60-mm thick layer of water for cooling passes between the wall of the tank 3 and the wall of the reactor 4. The cooling water is introduced via feeding tank 11 into the lower part of the tank 3 through feed pipe 12.

A gas line 13 with a diameter of 130–160 mm with safety valve 14 for the release of the generated gas, and branch pipe 15 for the removal of condensed steam are positioned on the lid 9 of the tank 3. A steel cable of 4-mm diameter with handle 16 descends from the safety valve, by the assistance of which the valve may be operated by hand. Hatches 17 for the loading of automobile tires and the removal of ashes are positioned on the side of the tank 3.

An ignition vent 18, through which the process is started, is positioned on the lower hatch 17.

Four hatches 19 for cleansing the ventilation duct of the ashy remnants of combustion are positioned symmetrically along the diameter of the bottom of the tank 3.

The utilization assembly consists of a pipe 20 with diameter 400–600 mm, insulated from within by heat-resistant concrete, and a secondary air blower 21 joined by a secondary air feeding duct 22 with a secondary air throttle 23 of 100–250 mm diameter. The ignition and combustion injector 24 is positioned on the pipe 20 at a 120° angle.

The utilization assembly is connected with the gasification unit through a gas line 13.

Control of the work of the submitted apparatus is accomplished with the help of instruments KIP and A, which are located in the control cabinet (panel) 25. Before starting the apparatus an inspection of the following assemblies is conducted: the primary blower 2, the blower 21, and the ignition and combustion injector 24, after which the reactor 4 is loaded with used automobile tires via the loading-unloading hatch 17. After the reactor 4 is loaded, the ignition injector 24 is started and the tank of the gas generator 3 is filled with water through the feeding tank 11. The ignition and combustion injector 24 heats up the conduit 20, shielded by heat-resistant concrete, within ten minutes. Thereafter, rags are heaped inside around the lower hatch 17, the rags and automobile tires are doused with kerosene (3–5 liters), the apparatus is closed and the rags and tires are ignited by a flame through the ignition vent 18, first opening the safety valve 14. Within 3–5 minutes the tires in the reactor 4 are aflame. When backfires begin to pop in the ignition vent 18, it is closed and the primary blower 2 and the secondary blower 21 are started. The throttle 7 for the primary ventilator 2 and the throttle 23 for the secondary ventilator 21 are opened to max. Then, the safety valve 14 is closed and the gas enters the combustion assembly through the pipeline 13. After 20 minutes of work to attain the optimal flame, the supply of fuel oil at the ignition and combustion injector 24 is cut off. Control of the process is accomplished with the help of instruments KIP and A, which are located in the control cabinet (panel) 25. During the process, the temperature of the gas in the reactor 4 varies from 100° to 500° C. The temperature of the flame reaches from 1000° to 1500° C. The reactor 4 holds from 1800 kg to 2500 kg of used automobile tires per load, and the work cycle lasts 12 to 15 hours.

Upon completion of the process of obtaining combustible gas, a gradual extinguishing takes place, after which the primary ventilator 2 and the second ventilator 21 are turned off and the supply of fuel to the ignition and combustion injector 24 is cut off. The ignition and combustion injector 24 burns the remaining gases within 30 minutes, after which the ignition and combustion injector is turned off.

When the cycle has ended, the throttle 7 for the ventilator 2 of primary air is closed, after which the process in the reactor 4 extinguishes due to a lack of oxygen.

The fuel expenditure for the ignition and combustion injector 24 for one cycle is from 14 to 16 kg of diesel fuel.

What is claimed is:

1. A batch method of disposing of waste materials containing polymer compounds and generating a hydrocarbon rich effluent stream comprising the steps of:

(a) placing a charge of polymer containing waste materials in a chamber;

(b) igniting the charge of polymer containing waste materials by an initiation charge of a liquid hydrocarbon to initiate combustion and introducing air to support combustion; and (c) maintaining combustion of said polymer containing waste materials at 1000° to 1500° C. while removing a polymer rich gas stream from said chamber for the manufacture of oil and gas for the chemical and power industries; and (d) terminating introduction of air when polymer materials in said polymer containing waste materials have been substantially removed therefrom.

2. The method of claim 1 wherein said liquid hydrocarbon is fuel oil.

3. The method of claim 1 wherein said waste materials comprise used tires.

4. The method of claim 1 wherein said batch method is completed within about 12 to 15 hours.

\* \* \* \* \*